US010852825B2

(12) United States Patent
Yoon et al.

(10) Patent No.: US 10,852,825 B2
(45) Date of Patent: Dec. 1, 2020

(54) SELECTIVE RESTRICTION OF SKELETAL JOINT MOTION

(71) Applicant: Microsoft Technology Licensing, LLC, Redmond, WA (US)

(72) Inventors: Sang Ho Yoon, Redmond, WA (US); James David Holbery, Bellevue, WA (US); Siyuan Ma, Bothell, WA (US); Woo Suk Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/123,682

(22) Filed: Sep. 6, 2018

(65) Prior Publication Data
US 2020/0081532 A1 Mar. 12, 2020

(51) Int. Cl.
*G06F 3/01* (2006.01)
*G06F 3/038* (2013.01)

(52) U.S. Cl.
CPC .......... *G06F 3/014* (2013.01); *G06F 3/0383* (2013.01); *G06F 3/016* (2013.01)

(58) Field of Classification Search
CPC ...... A61F 2002/6845; A61F 2002/6818; A61F 2005/0167; A61F 2005/0169; A61F 2002/704; A61F 2005/0155; A61F 2002/503; A61F 2002/5033; A61F 2/68; A61F 2002/701; A61H 2201/165;
(Continued)

(56) References Cited

U.S. PATENT DOCUMENTS 2,897,425 A 7/1959 Waring et al.
3,356,195 A 12/1967 Hale et al.
(Continued)

FOREIGN PATENT DOCUMENTS

CN 100998527 A 7/2007
CN 106726027 A 5/2017
(Continued)

OTHER PUBLICATIONS

"International Search Report and Written Opinion Issued in PCT Application No. PCT/US2018/054051", dated Jan. 4, 2019, 13 Pages.
(Continued)

*Primary Examiner* — Michael J Jansen, II
(74) *Attorney, Agent, or Firm* — Alleman Hall Creasman & Tuttle LLP

(57) ABSTRACT

One example provides a wireless wearable device including a flexible wearable base configured to be worn at a location of a skeletal joint, an electrostatic clutch including a first electrode, the first electrode having two or more first electrode sheets, each first electrode sheet having a core, a conductive layer formed on the core, and a dielectric coating formed on the conductive layer, and also having a common conductor to which each of the first electrode sheets are connected, and a second electrode having two or more second electrode sheets arranged alternately with the first electrode sheets in a stacked arrangement, a tensioner coupled to the electrostatic clutch, a battery, and control circuitry coupled to the electrostatic clutch and configured to generate a control signal to control an electrostatic force between the two or more first electrode sheets and the two or more second electrode sheets.

20 Claims, 8 Drawing Sheets

(58) Field of Classification Search
CPC ............ B25J 9/0006; A63B 21/00181; G02B 27/017; G02B 27/0093; G06F 3/015; G06F 3/011; G06F 3/016; G06F 3/014; G06F 1/163
See application file for complete search history.

(56) References Cited

U.S. PATENT DOCUMENTS

| | | | |
|---|---|---|---|
| 4,753,442 A | 6/1988 | Bland | |
| 4,896,754 A | 1/1990 | Carlson et al. | |
| 4,965,429 A | 10/1990 | Polstorff | |
| 4,987,332 A | 1/1991 | Yamamoto et al. | |
| 5,173,834 A | 12/1992 | Sogoh | |
| 5,184,319 A | 2/1993 | Kramer | |
| 5,429,140 A | 7/1995 | Burdea et al. | |
| 5,508,327 A | 4/1996 | Cipriano et al. | |
| 5,516,249 A | 5/1996 | Brimhall | |
| 5,631,861 A * | 5/1997 | Kramer | G06F 3/011 414/5 |
| 6,084,321 A | 7/2000 | Hunter et al. | |
| 6,128,004 A * | 10/2000 | McDowall | G06F 3/014 345/156 |
| 6,413,229 B1 | 7/2002 | Kramer et al. | |
| 6,497,149 B1 | 12/2002 | Moreau et al. | |
| 6,524,681 B1 | 2/2003 | Seitz et al. | |
| 6,790,308 B2 * | 9/2004 | Murphy | B23P 15/00 156/265 |
| 6,809,462 B2 | 10/2004 | Pelrine et al. | |
| 6,966,882 B2 * | 11/2005 | Horst | A61H 1/0237 601/33 |
| 7,046,151 B2 | 5/2006 | Dundon | |
| 7,056,297 B2 * | 6/2006 | Dohno | A63B 21/00181 310/316.01 |
| 7,166,953 B2 * | 1/2007 | Heim | H01L 41/0986 310/328 |
| 7,250,935 B2 * | 7/2007 | Kubota | G06F 3/014 345/156 |
| 7,365,463 B2 | 4/2008 | Horst et al. | |
| 7,390,157 B2 * | 6/2008 | Kramer | G06F 3/011 414/5 |
| 7,407,895 B2 * | 8/2008 | Kunitake | C23C 18/1212 438/785 |
| 7,481,782 B2 * | 1/2009 | Scott | A61F 2/586 601/5 |
| 7,537,573 B2 * | 5/2009 | Horst | A61H 1/0237 482/5 |
| 7,545,349 B2 * | 6/2009 | Yamada | G09G 3/3208 345/76 |
| 7,551,419 B2 | 6/2009 | Pelrine et al. | |
| 7,920,124 B2 * | 4/2011 | Tokita | G06F 3/011 345/156 |
| 8,029,414 B2 | 10/2011 | Ingvast et al. | |
| 8,049,772 B2 * | 11/2011 | Lipton | G09G 3/003 348/42 |
| 8,058,853 B2 * | 11/2011 | Murota | H02M 3/158 323/267 |
| 8,138,895 B2 | 3/2012 | Kato et al. | |
| 8,160,743 B2 | 4/2012 | Birkenbach et al. | |
| 8,164,232 B2 * | 4/2012 | Kornbluh | H02N 1/00 310/309 |
| 8,255,079 B2 | 8/2012 | Linn et al. | |
| 8,325,458 B2 | 12/2012 | Prahlad et al. | |
| 8,330,590 B2 * | 12/2012 | Poupyrev | G06F 3/044 340/407.2 |
| 8,362,882 B2 * | 1/2013 | Heubel | G06F 3/04886 340/407.1 |
| 8,638,024 B2 | 1/2014 | Anderson et al. | |
| 8,665,241 B2 | 3/2014 | Heubel et al. | |
| 8,679,040 B2 | 3/2014 | Horst | |
| 8,833,826 B2 | 9/2014 | Garcia et al. | |
| 8,860,336 B2 | 10/2014 | Anderson et al. | |
| 8,861,171 B2 | 10/2014 | Prahlad et al. | |
| 8,882,285 B2 * | 11/2014 | Walsh | C09K 11/602 362/103 |
| 8,964,351 B2 | 2/2015 | Horinouchi | |
| 8,998,831 B2 * | 4/2015 | Sankai | A61B 5/04888 601/40 |
| 9,093,926 B2 | 7/2015 | Prahlad et al. | |
| 9,120,220 B2 * | 9/2015 | Bergelin | B25J 9/104 |
| 9,148,074 B2 * | 9/2015 | Boughtwood | H02N 1/004 |
| 9,170,288 B2 | 10/2015 | O'Brien et al. | |
| 9,180,866 B2 * | 11/2015 | Helmer | B60K 6/387 |
| 9,266,233 B2 | 2/2016 | Kornbluh | B25J 9/0006 |
| 9,301,563 B2 * | 4/2016 | Hardy | A41D 19/0031 |
| 9,375,382 B2 * | 6/2016 | Fausti | A61H 1/0285 |
| 9,401,668 B2 * | 7/2016 | Prahlad | H02N 13/00 |
| 9,403,056 B2 | 8/2016 | Weinberg et al. | |
| 9,403,272 B2 * | 8/2016 | Kornbluh | B25J 9/0006 |
| 9,417,693 B2 * | 8/2016 | Seth | G06F 3/017 |
| 9,427,864 B2 * | 8/2016 | Kornbluh | B25J 9/0006 |
| 9,529,433 B2 * | 12/2016 | Shankar | G06F 3/014 |
| 9,606,624 B2 * | 3/2017 | Cruz-Hernandez | G06F 3/016 |
| 9,710,060 B2 * | 7/2017 | McMillen | H03K 17/964 |
| 9,846,482 B2 * | 12/2017 | Seth | G06F 3/017 |
| 9,921,609 B2 * | 3/2018 | Levesque | G06F 1/1652 |
| 9,931,235 B2 | 4/2018 | Summer et al. | |
| 9,939,468 B1 | 4/2018 | Dyszel | |
| 9,950,422 B2 * | 4/2018 | Kornbluh | B25J 9/0006 |
| 9,983,672 B2 * | 5/2018 | Olien | G06F 3/016 |
| 10,012,276 B2 * | 7/2018 | Eckerle | F16D 48/064 |
| 10,013,062 B1 | 7/2018 | Corson et al. | |
| 10,025,387 B2 * | 7/2018 | Keller | G06F 3/014 |
| 10,055,019 B2 * | 8/2018 | Beran | A63F 13/812 |
| 10,055,022 B2 * | 8/2018 | Appleyard | G06F 3/016 |
| 10,082,872 B2 * | 9/2018 | Cruz-Hernandez | G06F 3/016 |
| 10,082,875 B1 * | 9/2018 | Kim | G06F 3/016 |
| 10,104,923 B2 * | 10/2018 | Howland | A41D 19/0031 |
| 10,105,839 B2 * | 10/2018 | Kornbluh | B25J 9/0006 |
| 10,137,362 B2 * | 11/2018 | Buchanan, IV | A63F 13/42 |
| 10,197,459 B2 * | 2/2019 | Keller | G01L 1/144 |
| 10,228,396 B2 | 3/2019 | Gisby | H01L 41/042 |
| 10,248,200 B2 * | 4/2019 | Cohen | B25J 13/025 |
| 10,275,025 B2 * | 4/2019 | Black | G06F 3/014 |
| 10,281,982 B2 * | 5/2019 | Keller | G06F 3/016 |
| 10,317,998 B2 * | 6/2019 | Holbery | B32B 5/02 |
| 10,355,624 B2 * | 7/2019 | Majidi | H02N 13/00 |
| 10,366,583 B2 * | 7/2019 | Khoshkava | G06F 3/0488 |
| 10,372,213 B2 * | 8/2019 | Keller | G06F 3/014 |
| 10,381,143 B2 * | 8/2019 | Khoshkava | H01F 27/2823 |
| 10,423,227 B2 * | 9/2019 | Gu | G06F 3/014 |
| 10,427,293 B2 * | 10/2019 | Asbeck | B25J 9/0006 |
| 10,433,367 B2 | 10/2019 | Pratt et al. | |
| 10,437,335 B2 * | 10/2019 | Daniels | G06F 3/015 |
| 10,466,784 B2 * | 11/2019 | Cohen | A61B 5/225 |
| 10,474,236 B1 | 11/2019 | Stewart et al. | |
| 10,514,759 B2 * | 12/2019 | Taylor | G06F 3/0414 |
| 10,521,947 B2 * | 12/2019 | Yokokawa | G06F 3/012 |
| 10,528,138 B2 * | 1/2020 | Keller | G06F 3/017 |
| 10,543,110 B2 * | 1/2020 | Piercy | A43B 7/20 |
| 10,561,565 B2 | 2/2020 | John et al. | |
| 10,564,722 B2 * | 2/2020 | Keller | G06F 3/016 |
| 10,572,011 B2 * | 2/2020 | Holbery | A63F 13/285 |
| 10,572,014 B2 * | 2/2020 | Keller | G06F 3/011 |
| 10,595,618 B2 * | 3/2020 | Wang | G02B 6/0091 |
| 10,603,190 B2 * | 3/2020 | Mateus Dias Quinaz | A61B 5/6806 |
| 10,627,783 B2 * | 4/2020 | Rothkopf | G04G 21/025 |
| 10,663,016 B2 * | 5/2020 | Schmitz | F16D 13/52 |
| 2002/0130673 A1 * | 9/2002 | Pelrine | A63H 3/365 324/727 |
| 2002/0175598 A1 | 11/2002 | Heim et al. | |
| 2003/0125781 A1 * | 7/2003 | Dohno | A63B 21/00181 607/75 |
| 2004/0084261 A1 | 5/2004 | Burgoon et al. | |
| 2004/0102723 A1 * | 5/2004 | Horst | A61H 1/0237 601/5 |
| 2004/0129380 A1 | 7/2004 | Murphy et al. | |
| 2004/0174337 A1 | 9/2004 | Kubota et al. | |
| 2005/0012485 A1 * | 1/2005 | Dundon | G06F 3/011 318/568.11 |

(56) References Cited

U.S. PATENT DOCUMENTS

| | | | |
|---|---|---|---|
| 2006/0004307 A1* | 1/2006 | Horst | A61H 1/0237 601/5 |
| 2006/0094989 A1* | 5/2006 | Scott | A61F 2/54 601/5 |
| 2006/0115348 A1* | 6/2006 | Kramer | B25J 13/025 414/5 |
| 2006/0152098 A1* | 7/2006 | Horst | H02K 99/20 310/120 |
| 2006/0261516 A1 | 11/2006 | Kunitake et al. | |
| 2007/0016265 A1 | 1/2007 | Davoodi et al. | |
| 2007/0129846 A1* | 6/2007 | Birkenbach | A61B 34/70 700/245 |
| 2007/0195482 A1 | 8/2007 | Muka et al. | |
| 2008/0059131 A1* | 3/2008 | Tokita | G06F 3/011 703/5 |
| 2008/0089002 A1* | 4/2008 | Pelrine | H02N 13/00 361/234 |
| 2008/0153590 A1 | 6/2008 | Ombrellaro et al. | |
| 2009/0102620 A1* | 4/2009 | Kato | G06F 3/016 340/407.1 |
| 2010/0007240 A1 | 1/2010 | Kornbluh et al. | |
| 2010/0041521 A1* | 2/2010 | Ingvast | A61H 1/0288 482/49 |
| 2010/0045251 A1 | 2/2010 | Murota | |
| 2010/0085169 A1 | 4/2010 | Poupyrev et al. | |
| 2010/0141407 A1 | 6/2010 | Heubel et al. | |
| 2010/0318006 A1* | 12/2010 | Horst | A61H 1/0237 601/34 |
| 2011/0071664 A1* | 3/2011 | Linn | B25J 9/0006 700/213 |
| 2011/0101823 A1* | 5/2011 | Anderson | H01L 41/0986 310/317 |
| 2011/0187637 A1* | 8/2011 | Nichols | G06F 3/044 345/156 |
| 2011/0193362 A1* | 8/2011 | Prahlad | B25J 15/0085 294/81.2 |
| 2011/0234414 A1 | 9/2011 | Ojeda et al. | |
| 2012/0029399 A1* | 2/2012 | Sankai | A61H 1/0288 601/40 |
| 2012/0053498 A1 | 3/2012 | Horst | |
| 2012/0086366 A1* | 4/2012 | Anderson | H02N 2/062 318/116 |
| 2012/0109025 A1* | 5/2012 | Weinberg | A63B 21/00181 601/5 |
| 2012/0154974 A1 | 6/2012 | Bhatnagar et al. | |
| 2012/0182720 A1 | 7/2012 | Walsh | |
| 2013/0010398 A1 | 1/2013 | Prahlad et al. | |
| 2013/0072829 A1* | 3/2013 | Fausti | A61H 1/0285 601/40 |
| 2013/0088117 A1 | 4/2013 | Boughtwood | |
| 2013/0155020 A1* | 6/2013 | Heubel | A41D 1/005 345/174 |
| 2013/0226350 A1* | 8/2013 | Bergelin | B25J 9/0006 700/275 |
| 2013/0242455 A1* | 9/2013 | Prahlad | B25J 15/0009 361/234 |
| 2013/0285577 A1* | 10/2013 | O'Brien | H01L 41/042 318/116 |
| 2013/0294875 A1* | 11/2013 | Prahlad | B65G 17/46 414/730 |
| 2013/0330162 A1* | 12/2013 | Horinouchi | B25J 5/007 414/730 |
| 2014/0035306 A1* | 2/2014 | Garcia | B25J 15/0009 294/213 |
| 2014/0162598 A1 | 6/2014 | Villa-Real | |
| 2014/0215684 A1* | 8/2014 | Hardy | A41D 19/0031 2/160 |
| 2014/0277739 A1 | 9/2014 | Kornbluh et al. | |
| 2014/0329640 A1 | 11/2014 | Helmer et al. | |
| 2015/0123647 A1* | 5/2015 | Gisby | H02N 2/181 324/76.11 |
| 2015/0266180 A1* | 9/2015 | Kornbluh | B25J 9/0006 700/260 |
| 2015/0266181 A1* | 9/2015 | Kornbluh | B25J 9/0006 700/260 |
| 2015/0321339 A1 | 11/2015 | Asbeck et al. | |
| 2016/0004308 A1* | 1/2016 | Cruz-Hernandez | G06F 3/016 345/173 |
| 2016/0017940 A1 | 1/2016 | Eckerle | |
| 2016/0025459 A1 | 1/2016 | Kwint et al. | |
| 2016/0030835 A1 | 2/2016 | Argiro | |
| 2016/0070347 A1* | 3/2016 | McMillen | H03K 17/964 345/173 |
| 2016/0101516 A1* | 4/2016 | Kornbluh | B25J 9/0006 482/78 |
| 2016/0101517 A1 | 4/2016 | Kornbluh et al. | |
| 2016/0120734 A1 | 5/2016 | Ishikawa et al. | |
| 2016/0124548 A1* | 5/2016 | Cherif | G06F 3/044 345/174 |
| 2016/0162022 A1* | 6/2016 | Seth | G06F 3/017 345/156 |
| 2016/0187973 A1 | 6/2016 | Shankar et al. | |
| 2016/0187977 A1* | 6/2016 | Cruz-Hernandez | G06F 3/016 345/156 |
| 2016/0209448 A1 | 7/2016 | Currie et al. | |
| 2016/0213548 A1* | 7/2016 | John | A61F 2/50 |
| 2016/0224115 A1* | 8/2016 | Olien | G06F 3/04883 |
| 2016/0229635 A1* | 8/2016 | Summer | A61F 5/013 |
| 2016/0259417 A1* | 9/2016 | Gu | G06F 3/016 |
| 2016/0278948 A1* | 9/2016 | Piercy | A43B 7/20 |
| 2016/0342207 A1* | 11/2016 | Beran | G06F 3/011 |
| 2016/0361179 A1 | 12/2016 | Mateus Dias Quinaz | |
| 2016/0363887 A1 | 12/2016 | Nodera et al. | |
| 2016/0363997 A1* | 12/2016 | Black | G06F 3/016 |
| 2016/0378071 A1 | 12/2016 | Rothkopf | |
| 2017/0014111 A1* | 1/2017 | Hulseman | B29C 59/025 |
| 2017/0038839 A1* | 2/2017 | Seth | G06F 3/017 |
| 2017/0055596 A1 | 3/2017 | Colby et al. | |
| 2017/0061753 A1 | 3/2017 | Khoshkava et al. | |
| 2017/0131769 A1* | 5/2017 | Keller | G06F 3/016 |
| 2017/0131770 A1* | 5/2017 | Keller | G06F 3/014 |
| 2017/0160807 A1 | 6/2017 | Keller et al. | |
| 2017/0165567 A1 | 6/2017 | Walters | |
| 2017/0168565 A1 | 6/2017 | Cohen et al. | |
| 2017/0176267 A1* | 6/2017 | Keller | G01L 1/144 |
| 2017/0185152 A1* | 6/2017 | Keller | G06F 3/016 |
| 2017/0212589 A1 | 7/2017 | Domenikos et al. | |
| 2017/0222576 A1 | 8/2017 | Majidi et al. | |
| 2017/0248272 A1 | 8/2017 | Ullrich et al. | |
| 2017/0273374 A1 | 9/2017 | Howland et al. | |
| 2017/0319950 A1* | 11/2017 | Buchanan, IV | A63F 13/42 |
| 2017/0371416 A1 | 12/2017 | Zeitler | |
| 2018/0039302 A1* | 2/2018 | Levesque | G06F 3/0487 |
| 2018/0055713 A1* | 3/2018 | Cromie | A63B 21/4007 |
| 2018/0056104 A1* | 3/2018 | Cromie | A63B 21/4007 |
| 2018/0077976 A1 | 3/2018 | Keller et al. | |
| 2018/0081436 A1 | 3/2018 | Keller et al. | |
| 2018/0081437 A1 | 3/2018 | Taylor et al. | |
| 2018/0081439 A1* | 3/2018 | Daniels | G06F 1/163 |
| 2018/0098583 A1* | 4/2018 | Keller | A41D 19/0024 |
| 2018/0107277 A1* | 4/2018 | Keller | G06F 3/014 |
| 2018/0140441 A1 | 5/2018 | Poirters | |
| 2018/0143687 A1 | 5/2018 | Moessinger et al. | |
| 2018/0151281 A1 | 5/2018 | Khoshkava et al. | |
| 2018/0153722 A1* | 6/2018 | Cromie | A61B 5/7267 |
| 2018/0196515 A1* | 7/2018 | Appleyard | G06F 3/016 |
| 2018/0258562 A1 | 9/2018 | Fukuhara | |
| 2018/0260052 A1 | 9/2018 | Karagozler | |
| 2018/0311570 A1* | 11/2018 | Buchanan | A63F 13/42 |
| 2018/0314334 A1* | 11/2018 | Appleyard | G06F 3/016 |
| 2018/0319020 A1 | 11/2018 | Prahlad et al. | |
| 2018/0324896 A1* | 11/2018 | Pratt | G06F 3/0346 |
| 2018/0335841 A1 | 11/2018 | Rubin et al. | |
| 2018/0361566 A1* | 12/2018 | Kornbluh | B25J 9/0006 |
| 2018/0368559 A1 | 12/2018 | Wang et al. | |
| 2018/0373331 A1* | 12/2018 | Holbery | B32B 5/02 |
| 2019/0004602 A1 | 1/2019 | Holbery | |
| 2019/0101983 A1* | 4/2019 | Cohen | B25J 13/025 |
| 2019/0102927 A1* | 4/2019 | Yokokawa | G06T 13/40 |

(56) References Cited

U.S. PATENT DOCUMENTS

| | | | |
|---|---|---|---|
| 2019/0107157 A1 | 4/2019 | Schmitz et al. | |
| 2019/0176320 A1* | 6/2019 | Smith | B25J 3/04 |
| 2019/0204921 A1* | 7/2019 | Goupil | G06F 3/014 |
| 2019/0209086 A1* | 7/2019 | Huang | A61B 5/1126 |
| 2019/0247050 A1 | 8/2019 | Goldsmith | |
| 2019/0282131 A1* | 9/2019 | Chang | A61B 5/1123 |
| 2019/0283247 A1* | 9/2019 | Chang | B25J 9/0006 |
| 2019/0339773 A1 | 11/2019 | Holbery et al. | |
| 2019/0343707 A1 | 11/2019 | Riener et al. | |
| 2019/0346938 A1 | 11/2019 | Wang et al. | |
| 2019/0352808 A1 | 11/2019 | Yoon et al. | |
| 2020/0012344 A1 | 1/2020 | Mcmillen et al. | |
| 2020/0012345 A1 | 1/2020 | Wang et al. | |
| 2020/0016363 A1 | 1/2020 | Macri et al. | |
| 2020/0029635 A1 | 1/2020 | Kiemele et al. | |
| 2020/0081533 A1 | 3/2020 | Holbery et al. | |

FOREIGN PATENT DOCUMENTS

| | | |
|---|---|---|
| DE | 10119509 A1 | 10/2002 |
| DE | 102015113827 A1 | 2/2017 |
| EP | 0782843 A2 | 7/1967 |
| EP | 0981423 A2 | 3/2000 |
| EP | 3343325 A1 | 7/2018 |
| FI | 127459 B | 6/2018 |
| FR | 3040803 A1 | 3/2017 |
| GB | 2488760 A | 9/2012 |
| JP | H06126661 A | 5/1994 |
| JP | 11026150 A | 1/1998 |
| JP | H1030654 A | 2/1998 |
| JP | 2005227111 A | 8/2005 |
| WO | 2005089176 A2 | 9/2005 |
| WO | 2011116357 A2 | 9/2011 |
| WO | 2016012480 A2 | 1/2016 |
| WO | 2016057963 A1 | 4/2016 |
| WO | 2016070078 A1 | 5/2016 |
| WO | 2017199035 A1 | 11/2017 |
| WO | 2018031476 A1 | 2/2018 |
| WO | 2018059737 A1 | 4/2018 |
| WO | 2018122106 A1 | 7/2018 |

OTHER PUBLICATIONS

Diller, et al., "A lightweight, low-power electroadhesive clutch and spring for exoskeleton actuation", In Proceedings of IEEE International Conference on Robotics and Automation, May 16, 2016, 8 Pages.

Shintake, et al., "Versatile soft grippers with intrinsic electroadhesion based onmultifunctional polymer actuators", In Journal of Advanced Materials, vol. 28, Issue 2, Jan. 2016, pp. 1-28.

Cassar, et al., "A Force Feedback Glove Based on Magnetorheological Fluid: Preliminary Design Issues", In Proceedings of 15th IEEE Mediterranean Electrotechnical Conference, May 2010, 7 Pages.

Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.

Azambuja, Enaie, "Electroadhesive clutch substitutes conventional ones in robotics", Retrieved from: https://www.electronicspecifier.com/robotics/electroadhesive-clutch-substitutes-conventional-ones-in-robotics, Jul. 8, 2016, 5 Pages.

Holbery, et al., "Electrostatic Slide Clutch with Bidirectional Drive Circuit", Application as Filed in U.S. Appl. No. 15/968,677, filed May 1, 2018, 36 Pages.

Pessina, Laure-Anne, "Ultra-light gloves let users "touch" virtual objects", Retrieved from: https://actu.epfl.ch/news/ultra-light-gloves-let-users-touch-virtual-objects/, Oct. 15, 2018, 3 Pages.

"Dupont LuxPrint 8153", Retrieved From: https://www.dupont.com/content/dam/dupont/products-and-services/electronic-and-electrical-materials/documents/prodlib/8153.pdf, Oct. 2009, 3 Pages.

"Plexus—high performance VR/AR gloves", Retrieved from: https://web.archive.org/web/20190306150539/http:/plexus.im/, Mar. 6, 2019, 2 Pages.

"Non Final Office Action Issued in U.S. Appl. No. 15/620,672", dated Apr. 29, 2019, 54 Pages.

"Non Final Office Action Issued in U.S. Appl. No. 15/968,677", dated Apr. 29, 2019, 44 Pages.

Bauer, et al., "Electromechanical Characterization and Measurement Protocol for Dielectric Elastomer Actuators", In Proceedings of SPIE—The International Society for Optical Engineering, vol. 6168, Mar. 20, 2006, 2 Pages.

Bianchi, Matteo, "A Fabric-Based Approach for Wearable Haptics", In Journal of Electronics, vol. 5, Issue 3, Jul. 26, 2017, 14 Pages.

Bolzmacher, et al., "Polymer Based Actuators for Virtual Reality Devices", In Proceedings of SPIE, vol. 5385, Jul. 27, 2004, pp. 281-289.

Choi, et al., "Wolverine: A Wearable Haptic Interface for Grasping in VR", In Proceedings of 29th Annual Symposium on User Interface Software and Technology, Oct. 16, 2016, 3 Pages.

Cohen, et al., "Virtual Reality Robotic Telesurgery Simulations using MEMICA Haptic System", In proceedings of the SPIE Smart Structures Conference, vol. 4329, Mar. 5, 2001, 7 Pages.

Delph, et al., "Modeling and Design of a Tendon Actuated Soft Robotic Exoskeletonfor Hemiparetic Upper Limb Rehabilitation", In Proceedings of 37th Annual International Conference of the IEEE Engineering in Medicine and Biology Society (EMBC), Aug. 25, 2015, pp. 3889-3892.

Diller, Stuart, "Demonstration: Electroadhesive Clutch", Retrieved From: https://www.youtube.com/watch?v=CufiVK76fPQ, Jul. 7, 2016, 2 Pages.

Diller, et al., "Exoskeleton Walking with a Lightweight, low-power Electroadhesive Clutch and Spring", In Proceedings of IEEE International Conference on Robotics and Automation (ICRA), Mar. 2016, 2 Pages.

Frediani, et al., "Wearable Wireless Tactile Display for Virtual Interactions with Soft Bodies", In Journal of Bioengineering and Biotechnology, vol. 2, Article 31, Sep. 2014, 7 Pages.

Gabardi, et al., "A New Wearable Fingertip Haptic Interface for the rendering of Virtual Shapes and Surface Features", In Proceedings of the IEEE Haptics Symposium, Apr. 8, 2016, pp. 140-146.

Gallego, Jelor, "New Super-Light Exoskeleton Created to Enhance the Human Body", Retrieved From: https://futurism.com/new-super-light-exoskeleton-created-to-enhance-the-human-body, Jul. 20, 2016, 4 Pages.

Heo, et al., "Current Hand Exoskeleton Technologies for Rehabilitation and Assistive Engineering", In International Journal of Precision Engineering and Manufacturing, vol. 13, Issue 5, May 1, 2012, pp. 807-824.

Kumar, et al., "MuJoCo HAPTIX: A Virtual Reality System for Hand Manipulation", In Proceedings of IEEE 15th International Conference on Humanoid Robots (Humanoids), Nov. 3, 2015, 7 Pages.

Lai, Richard, "Dexmo Exoskeleton Glove lets you Touch and Feel in VR", Retrieved From: https://www.engadget.com/2016/08/24/dexmo-exoskeleton-glove-force-feedback/, Aug. 24, 2016.

"International Search Report and Written Opinion Issued in PCT Application No. PCT/US19/028425", dated Jul. 3, 2019, 11 Pages.

"International Search Report and Written Opinion Issued in PCT Application No. PCT/US2017/062119", dated Mar. 12, 2018, 12 Pages.

Schorr, Samuel, "Wearable Skin Deformation Feedback for Force Sensory Substitution in Virtual Reality", Retrieved From: https://web.archive.org/web/20141114233415/https:/www.samuelschorr.com/research.html, Nov. 14, 2014, 8 Pages.

Xiloyannis, et al., "Preliminary Design and Control of a Soft Exosuit for Assisting Elbow Movements and Hand Grasping in Activities of Daily Living", In Journal of Rehabilitation and Assistive Technologies Engineering, vol. 4, Jan. 1, 2017, 15 Pages.

Ying, et al., "Visualization Bio-Mimetic Model of Muscular Drive", In Proceedings of IEEE International Symposium on Industrial Electronics, Jun. 4, 2007, 3 Pages.

Zhang, et al., "Dielectric Elastomer Actuators for a Portable Force Feedback Device", In Proceedings of the 4th International Symposium on Haptic Interfaces for Virtual Environment and Teleoperator Systems, Mar. 25, 2006, 8 Pages.

(56) References Cited

OTHER PUBLICATIONS

"Non Final Office Action Issued in U.S. Appl. No. 15/968,677", dated Apr. 9, 2020, 30 Pages.
"Non Final Office Action Issued in U.S. Appl. No. 16/046,708", dated Mar. 2, 2020, 9 Pages.
"Non Final Office Action Issued in U.S. Appl. No. 16/124,834", dated Mar. 23, 2020, 15 Pages.
"Notice of Allowance Issued in U.S. Appl. No. 16/406,202", dated Apr. 15, 2020, 8 Pages.
"Non Final Office Action Issued in U.S. Appl. No. 16/422,801", dated Mar. 11, 2020, 14 Pages.
"International Search Report and Written Opinion Issued in PCT Application No. PCT/US2019/038075", dated Sep. 9, 2019, 12 Pages.
"International Search Report and Written Opinion Issued in PCT Application No. PCT/US2019/038847", dated Oct. 2, 2019, 11 Pages.
"Final Office Action Issued in U.S. Appl. No. 15/968,677", dated Oct. 21, 2019, 26 Pages.
"Final Office Action Issued in U.S. Appl. No. 15/620,672", dated Nov. 26, 2019, 46 Pages.
"International Search Report and Written Opinion Issued in PCT Application No. PCT/US2019/038833", dated Nov. 5, 2019, 21 Pages.
"Final Office Action Issued in U.S. Appl. No. 16/422,801", dated Jun. 22, 2020, 23 Pages.
"Non Final Office Action Issued in U.S. Appl. No. 16/422,611", dated Jul. 9, 2020, 7 Pages.
"Final Office Action Issued in U.S. Appl. No. 16/046,708", dated Aug. 3, 2020, 11 Pages.
Hinchet, et al., "DextrES: Wearable Haptic Feedback for Grasping in VR via a Thin Form-Factor Electrostatic Brake", In Proceedings of the 31st Annual ACM Symposium on user Interface Software and Technology, Oct. 14, 2018, pp. 901-912.
"International Search Report and Written Opinion Issued in PCT Application No. PCT/US2020/026953", dated Jul. 6, 2020, 12 Pages.
"International Search Report and Written Opinion issued in PCT Application No. PCT/US2020/028379", dated Jul. 31, 2020, 10 Pages.
"Final Office Action Issued in U.S. Appl. No. 16/124,834", dated Sep. 28, 2020, 21 Pages.

\* cited by examiner

SELECTIVE RESTRICTION OF SKELETAL JOINT MOTION

BACKGROUND

Virtual reality (VR) display systems immerse a user in an alternate reality, with virtual imagery occupying an entire field of view. Augmented reality (AR) display systems, such as mixed reality (MR) display systems, display virtual objects mixed with real imagery, such as via a see-through display system. In either case, visual and auditory aspects of a virtual experience may be represented in a lifelike manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to selectively restricting motion of a skeletal joint. One example provides a wearable device comprising a flexible wearable base configured to be worn at a location of a skeletal joint, and an electrostatic clutch mounted to the flexible wearable base. The electrostatic clutch comprises a first electrode including two or more first electrode sheets, each first electrode sheet comprising a core, a conductive layer formed on the core, and a dielectric coating formed on the conductive layer, and the first electrode also comprising a common conductor to which each of the first electrode sheets are connected. The electrostatic clutch further includes a second electrode comprising two or more second electrode sheets arranged alternately with the first electrode sheets in a stacked arrangement. The wireless wearable device further comprises a tensioner coupled to the electrostatic clutch, a battery, and control circuitry coupled to the electrostatic clutch and configured to generate a control signal to control an electrostatic force between the two or more first electrode sheets and the two or more second electrode sheets.

DETAILED DESCRIPTION

Experiences provided by VR and AR devices may be immersive in the visual and auditory sense. However, such devices may not have the ability to provide realistic tactile feedback when a user interacts with displayed virtual objects. Thus, various mechanisms have been proposed to provide tactile feedback to interactions with displayed virtual objects. Some mechanisms utilize an exoskeleton that includes mechanical joints comprising electric motors, pneumatics, and/or hydraulics that may be controlled to inhibit movement about a corresponding skeletal joint. However, such an exoskeleton may feel rigid, heavy, and otherwise unnatural to a user, and may require connection to external control circuitry.

Other mechanisms may utilize an electrostatic clutch positioned to selectively restrict joint motion. Such a clutch may comprise two thin sheet electrodes and a dielectric layer disposed between the two sheet electrodes, such that an applied voltage between the sheet electrodes exerts a resistive force between the two sheet electrodes to selectively control motion of the sheets relative to one another. However, to generate sufficient force for such control, such a clutch may require the use of a large overlapping surface area, thereby resulting in an undesirably large device. Additionally, such a clutch may use a high input voltage to obtain a desired force. As such, the power supply and waveform generators used to control the operation of such clutches may be much too large to incorporate into a wearable device, thereby requiring the devices to be tethered to external power supply and control circuits via wired connections.

Accordingly, examples are disclosed that relate to an electrostatic clutch configured to addresses such issues. Briefly, the disclosed examples utilize an electrode arrangement in which multiple layers of overlapping electrode sheets are arranged in a stack, thereby allowing for the generation of relatively strong mechanical resistive forces in a smaller area than the use of single-sheet electrodes. Further, the disclosed examples comprise control circuitry for controlling the electrostatic clutch via a low input voltage (e.g., between 3 to 5 volts) and with low power usage, which may allow resistive force to be generated from the output of a lightweight battery, without being tethered to external circuitry or heavy-duty equipment. The stacked electrode arrangement and control circuitry together provide a compact and lightweight form factor for implementing an electrostatic clutch in a portable wireless wearable device.

Figure 1:
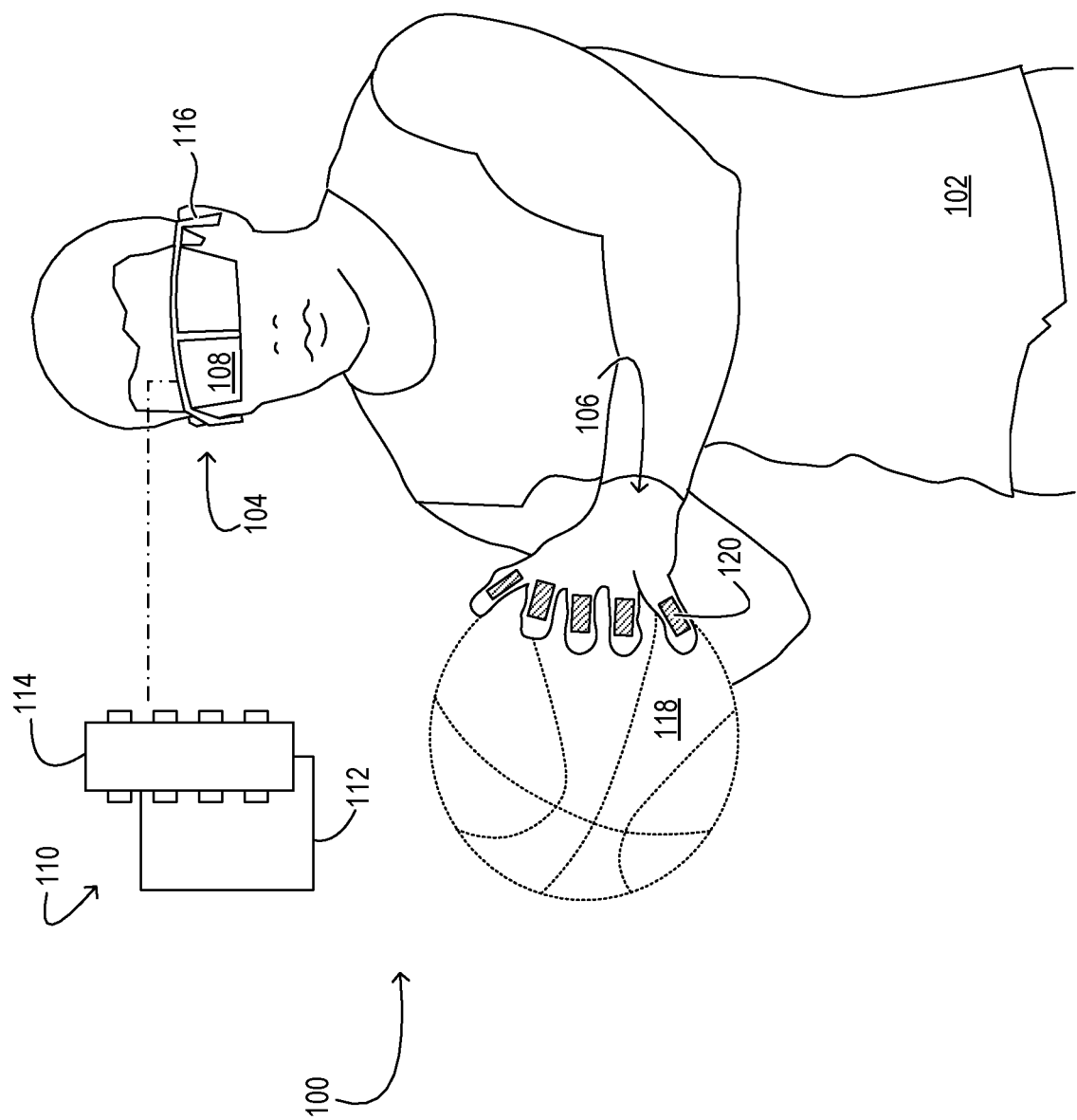
FIG. 1 shows an example use scenario in which an electrostatic clutch of a wearable device is controlled to simulate tactile interactions with displayed virtual imagery.

FIG. 1 shows aspects of an example display system 100 configured to present an augmented or virtual reality environment to a user 102. The display system 100 as illustrated is used to support gameplay, but may be used in numerous other scenarios as well. Display system 100 includes a head-mounted display (HMD) device 104 and a wireless wearable motion-restricting device 106. HMD device 104 includes a near-eye display 108 configured to display virtual imagery in the user's field of view. In some examples, the near-eye display 108 is a see-through display, enabling real-world and virtual imagery to be admixed in the user's field of view. In other examples, the near-eye display 108 is opaque, providing a fully immersive virtual reality. In the HMD device 104, signals encoding the virtual display imagery are sent to the display 108 via an on-board computing device 110. Computing device 110 includes at least one processor 112 and associated memory 114, examples of which are described below with reference to FIG. 8. HMD device 104 includes loudspeakers 116 that enable the user 102 to experience immersive audio.

Leveraging communications componentry arranged in the HMD device 104, the computing device 110 may be communicatively coupled to one or more off-board computing devices via a network. Thus, the virtual display imagery that the user 102 sees may, in some examples, be composed and/or rendered by an off-board computing device and sent wirelessly to the computing device 110. In other examples, the virtual display imagery may be composed and rendered on-board.

The motion-restricting device 106 is configured to further augment the augmented, mixed, or virtual reality experience by providing a lifelike physical sensation responsive to user interaction with virtual imagery. In the example shown in FIG. 1, the motion-restricting device 106 takes the form of a glove, which is worn on the hand of the user 102. In other examples, a motion-restricting device may take the form of a sleeve worn around an arm, a leg, and/or another body part.

The motion-restricting device 106 may be configured to provide a mechanically resistive physical sensation in response to detection of contact between the body of the user 102 and a virtual display object projected into a field of view of the user. In the example shown in FIG. 1, the mechanically resistive physical sensation may be provided whenever the hand of the user 102 intersects virtual basketball 118. In some examples, the mechanically resistive physical sensation provided by the wearable device upon user interaction with a virtual display object may vary based on the virtual display object, such that the user is provided different tactile experiences for interactions with different virtual objects (e.g. a virtual pillow compared to a virtual table).

Figure 2:
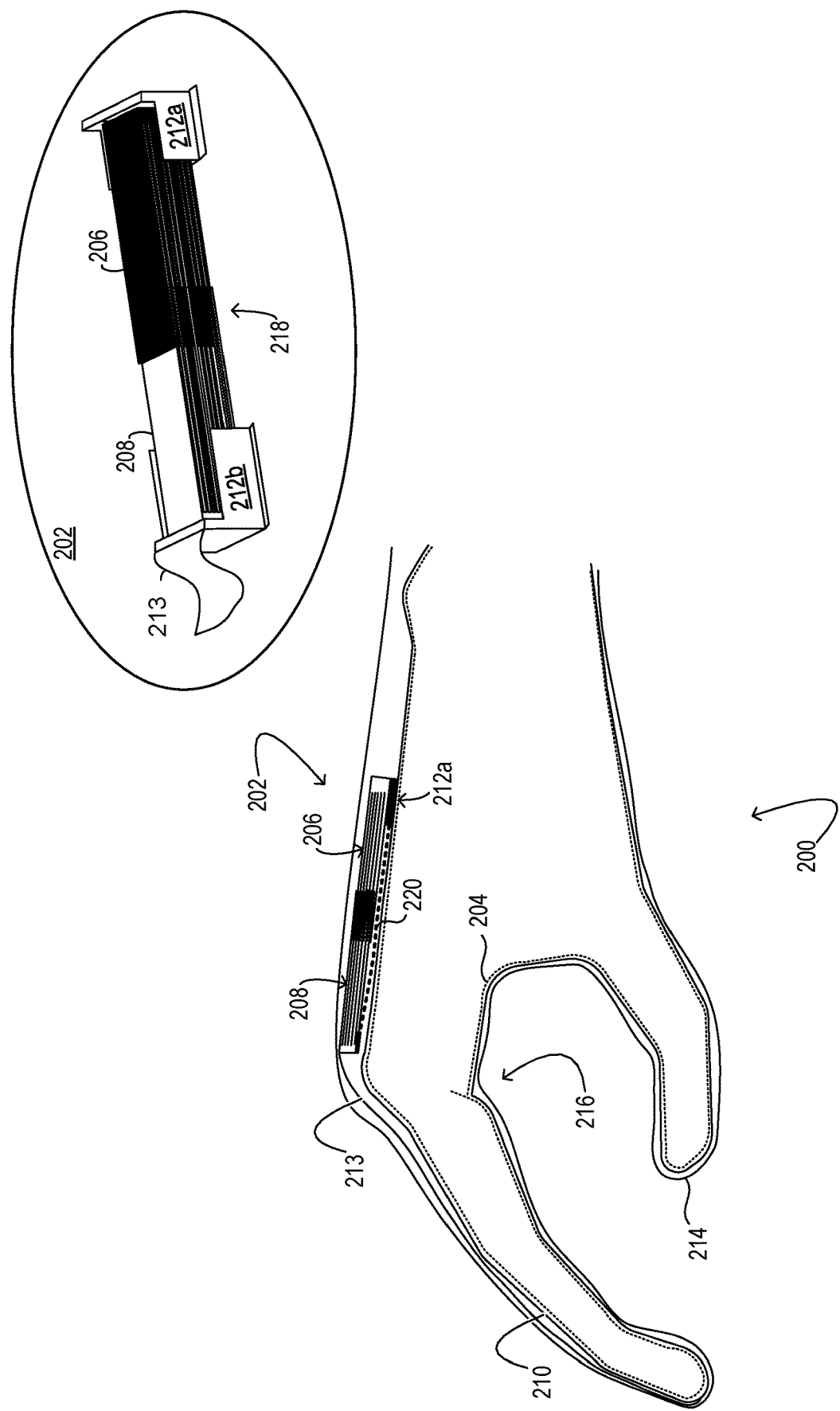
FIG. 2 shows an example wearable device including an electrostatic clutch.

To simulate the sensation of the touch of a virtual object on the user's hand, the wearable motion-restricting device 106 includes at least one electrostatic clutch 120. FIG. 2 schematically shows aspects of an example wearable motion-restricting device 200 that takes the form of a glove worn on a hand 204 of a user, and that may be used as motion-restricting device 106. An electrostatic clutch 202 is controllable to change a frictional force between two or more electrode sheets of a first electrode 206 and two or more electrode sheets of a second electrode 208 that are positioned alternately in a stacked arrangement and are moveable translationally with respect to each other. The electrostatic clutch 202 is mounted to a flexible wearable base 210 (such as an inner fabric layer of the glove, a substrate layer positioned on the inner layer of the glove, or even an outer surface of the glove), via a first housing 212a fixed to a distal end of the first electrode 206. The second electrode 208 is coupled via a second housing 212b to a flexible ribbon 213 that extends along a length of a finger portion of the wearable device between the inner 210 and outer fabric 214 layers of the glove. In other examples, an electrostatic clutch may be attached to a wearable device in any other suitable manner.

The second electrode 208 is configured to move relative to the first electrode 206 based upon flexion and extension of a skeletal joint 216, during which an overlapping region 218 of the first electrode 206 and the second electrode 208 shortens and lengthens, respectively. In FIG. 2, a single electrostatic clutch controls motion restriction for all skeletal joints of the forefinger. In other examples, two or more electrostatic clutches may be provided for a finger, such that different clutches restrict motion of different joints.

The flexible ribbon 213 connects the second electrode 208 to one or more locations of the wearable device 200 such that the flexible ribbon 213 pulls the second electrode relative to the first electrode when a finger is flexed. The flexible ribbon 213 may be formed from any suitable material, such as a stretchable or non-stretchable flexible fabric or polymer sheet. The use of the flexible ribbon 213 may help to more widely distribute a resistive force compared to the use of a narrower wire or yarn segment. In the illustrated example, the flexible ribbon 213 is disposed between the inner layer 210 and the outer layer 214 of the glove, but may be disposed outside of the glove in some examples. In other examples, a yarn, wire, or other suitable structure may be used instead of or in addition to the flexible ribbon 213.

Wireless wearable device 200 further comprises a tensioner, shown schematically as dashed line 220 in FIG. 2, configured to provide a retractive force so that the first and second electrode are pulled into a state of greater overlap when the skeletal joint extends. The tensioner 220 may take any suitable form, such as an elastomer band or a mechanical spring. In the illustrated example, the tensioner 220 is disposed between the inner glove layer 210 and the electrostatic clutch 202. In other examples, a tensioner may additionally or alternatively be positioned along one or both sides of the electrostatic clutch 202, and/or above the electrostatic clutch, on a side opposite to that depicted in FIG. 1.

Figure 3:
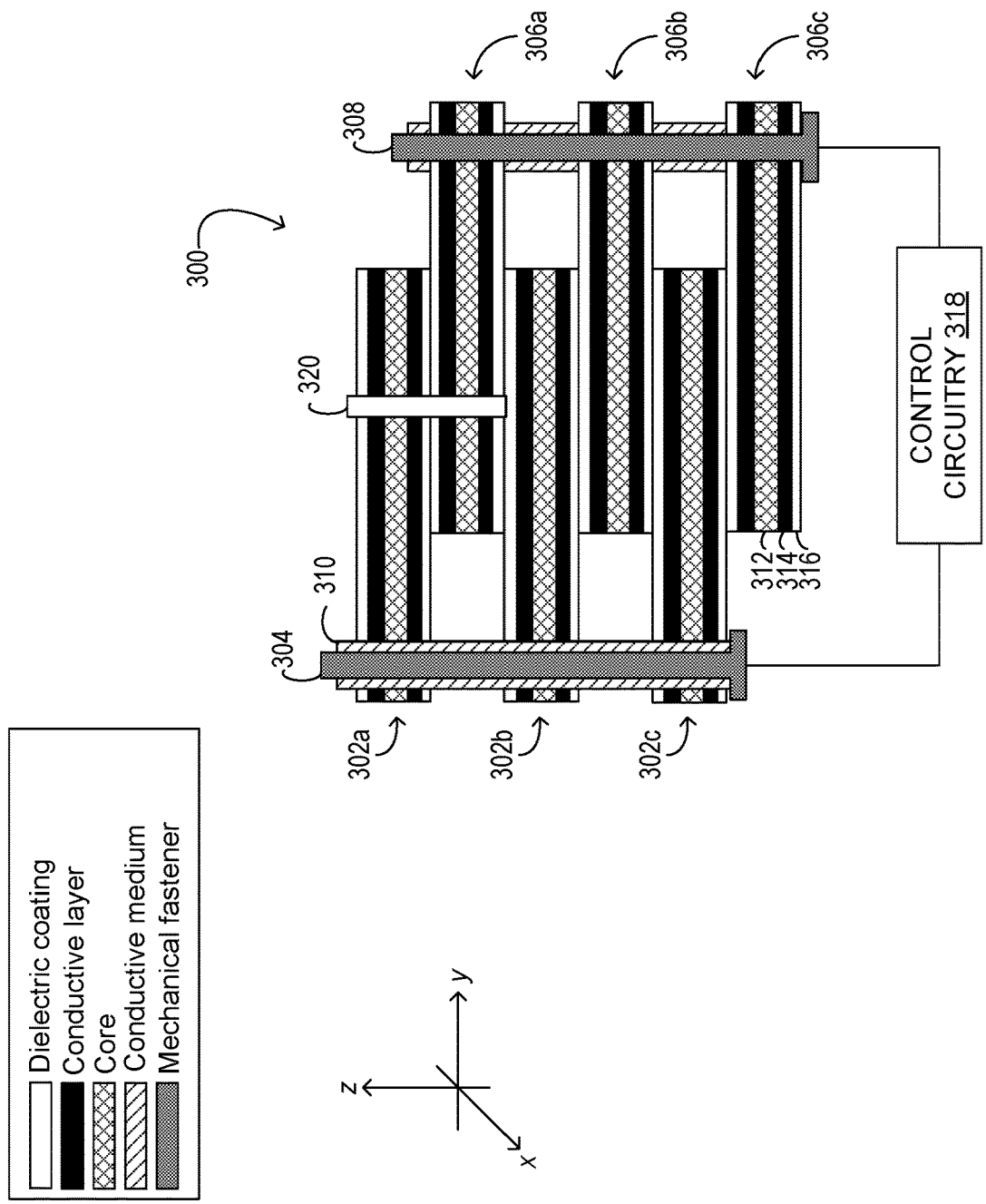
FIG. 3 schematically shows an example electrode arrangement for an electrostatic clutch.

Each electrode of the electrostatic clutch 202 includes two or more electrode sheets connected electrically via a common conductor. The electrode sheets may be mechanically and electrically connected in any suitable manner. FIG. 3 schematically shows an example electrostatic clutch 300 in which a first mechanical fastener 304 mechanically and electrically connects electrode sheets 302a, 302b, and 302c of a first electrode, and a second mechanical fastener 308 mechanically and electrically connects electrode sheets 306a, 306b, and 306c of a second electrode. The mechanical fasteners 304, 308 also respectively connect electrode sheets 302a, 302b, and 302c of the first electrode and electrode sheets 306a, 306b, and 306c of the second electrode to control circuitry 318. Mechanical fasteners 304 and 308 may take the form of a conductive metal screw, rivet or other suitable connector, and may be coated with a desired conductive material 310 (e.g. copper, silver-containing epoxy, etc.) in some examples.

Figure 4:
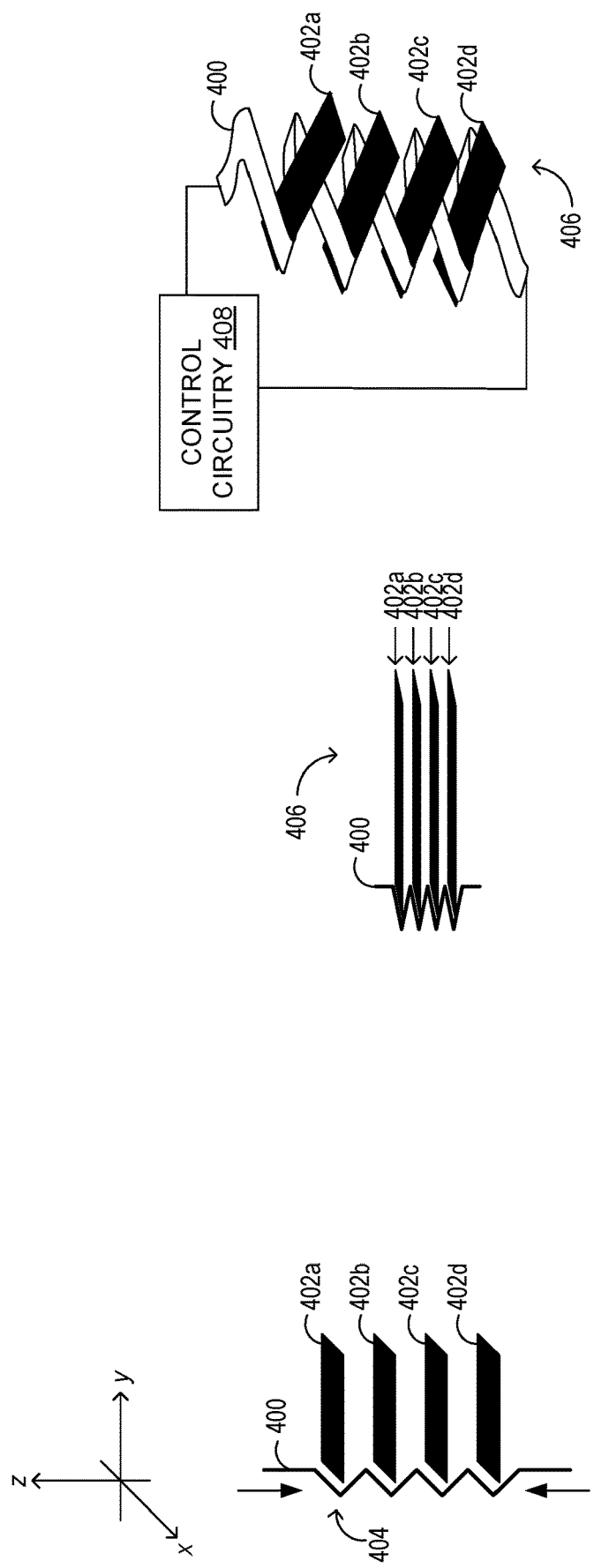
FIGS. 4A-4C schematically show another example electrode arrangement for an electrostatic clutch.

FIGS. 4A-4C show another example mechanism for electrically and mechanically connecting plural electrode sheets of an electrode. In this example, a conductive crimping structure 400 holds each electrode sheet 402a, 402b, 402c, and 402d of a first electrode within respective crimps, and electrically connects the electrode sheets 402a, 402b, 402c, and 402d to each other and to control circuitry 408. Each electrode sheet is positioned within a different crimp 404 (FIG. 4A), and a mechanical clamping force is applied to mechanically and electrically connect the electrode sheets 402a, 402b, 402c, and 402d to one another, thereby forming the first electrode 406 (FIG. 4B). FIG. 4C shows a different relative orientation of the crimping structure and the electrode sheets in which these structures are rotated ninety degrees relative to each other compared to FIGS. 4A and 4B. Crimping the electrode sheets 402a, 402b, 402c, and 402d as shown in FIGS. 4A-C further may help attain a low-profile electrode structure.

The conductive crimping structure 400 may be formed from any suitable material. Examples include metal foils, such as copper foil. The electrode sheets 402a, 402b, 402c, and 402d may be mechanically connected solely by mechanical clamping force, or a conductive adhesive may be used to help strengthen the connection between the electrode sheets and the conductive crimped structure. Any suitable conductive adhesive may be used, including a silver-containing polymer adhesive.

Continuing with FIG. 3, each electrode sheet includes a layered structure comprising a core 312, a conductive layer 314 formed on the core, and a dielectric coating 316 formed on the conductive layer. While the stacked electrode arrangement shown in FIG. 3 includes six electrode sheets, other examples may comprise any other suitable number of electrode sheets. In some examples, the number of electrode sheets, shape and configuration of a face of each electrode sheet, and/or a thickness of each electrode sheet may be selected to help prevent buckling of the electrode sheets as the tensioner pulls the electrodes into a state of greater overlap. In one specific example, a stacked electrode arrangement comprises 10 to 12 electrode sheets (e.g., 5 to 6 electrode sheets per electrode), each having a thickness in a range of 0.10 mm to 0.16 mm.

Applying voltage of either polarity to an electrode of an electrostatic clutch draws the electrodes together via the Coulomb force. Increasing normal force brings about a corresponding increase in both static and sliding friction forces between neighboring electrode sheets. Accordingly, materials and thicknesses of each layer within the layered electrode sheet structure may be selected based upon a desired electrostatic force provided at a given voltage, and/or to provide a suitably high electrostatic force at low operating voltages.

Core 312 may be formed from any material or materials of suitable tensile strength. Core 312 may be rigid or flexible, depending on the detailed configuration of the electrostatic clutch. In some examples, the core 312 comprises a fabric material or polymer film. In a more specific example, the core 312 comprises bi-axially oriented polyethylene terephthalate (BOPET).

An electrically conductive, continuous or discontinuous (e.g., patterned) conductive layer 314 is applied to the core 312 on opposing top and bottom surfaces of the core 312. Conductive layer 314 may be formed in any suitable manner, such as by printing (e.g. ink-jet printing, screen printing, gravure printing, or flexographic printing), other solvent-based coating methods (e.g. slot-die coatings and spin coatings), vacuum deposition methods such as physical vapor deposition, sputtering, chemical vapor deposition, electroless plating, electroplating, atomic-layer deposition, and/or other forms of material deposition. Any suitable conductive material may be used as conductive layer 314. Examples include graphite, silver, copper, and/or aluminum. In one specific example, a core sputtered with aluminum on a top surface and a bottom surface comprises a thickness in a range of 0.10 mm to 0.13 mm.

Dielectric coating 316 may be of a thickness and dielectric material selected to achieve a suitably strong electrostatic force at a given voltage, and to reduce the operating voltage for operating the electrostatic clutch. The dielectric material may also be selected to exhibit a high dielectric strength, in order to support a large electric field without suffering breakdown. In one example, electrode sheets of a first and second electrode having a 0.025 mm to 0.060 mm thick coating of barium titanate ($BaTiO_3$) may attain a tensile force of 60N with 300 volts applied between the first and second electrodes, and also may attain a tensile force of 70N with 350 volts applied between the first and second electrodes and an operating current of less than 50 nA. Comparatively, electrode sheets coated with lower dielectric constant materials, such as polymer-based dielectric materials, may attain a peak force during extension of 60N with 1000 volts or higher applied between the first and second electrodes. In other examples, the dielectric coating 316 may comprise any other suitable high-κ dielectric material, such as a material with a dielectric constant or κ≥50.

Dielectric coating 316 may be applied to the conductive layer 314 in any suitable manner. In the specific example of $BaTiO_3$, the dielectric layer may be formed via physical methods (e.g. sputtering) or chemical methods (e.g. CVD), as examples. In the example shown in FIG. 3, a high-κ dielectric material coats the conductive layer 314 of each electrode sheet 302a-c and 306a-c such that the dielectric coating of a first electrode sheet is in slidable contact with the dielectric coating of a second electrode sheet. In other examples, electrode sheets of the second electrode may omit the dielectric coating, such that the conductive layer on an electrode sheet of the second electrode is in slidable contact with the dielectric coating 316 of neighboring electrode sheets of the first electrode. In yet other examples, electrode sheets 302a-c of the first electrode and electrode sheets of the second 306a-c may comprise the dielectric coating 316 on a single face of the conductive layer 314 such that the dielectric coating 316 is in slidable contact with a conductive layer of a neighboring electrode sheet.

An electrostatic clutch further may comprise a displacement sensor 320 which provides an output signal responsive to the displacement of electrode sheets of the first electrode relative to electrode sheets of the second electrode. The output signal from the displacement sensor may facilitate various computations—e.g., estimating the degree of extension of the user's finger and the area of overlap between electrode sheets of the first electrode and electrode sheets of the second electrode. Any suitable displacement sensor may be used. In one example, an electrode sheet of the first electrode may include a plurality of contrast features detectable by a photodiode mounted to an electrode sheet of the second electrode, to generate a digital signal as the electrode sheet of the first electrode moves relative to the electrode sheet of the second electrode. Analog resistive and capacitive displacement sensors may also be used. Example capacitive displacement sensors include those in which the capacitance between an electrode sheet of the first electrode and an electrode sheet of the second electrode is measured and used to determine the degree of lateral displacement between the electrodes. The output from a displacement sensor may be provided to control circuitry, which may adjust a control signal based upon an amount of overlap between the electrodes. This may allow more charge to be applied to the electrode when less overlap is present to obtain a suitably strong resistive force.

As mentioned above, a wearable device may provide a user of a virtual or augmented reality display system with a tactile experience in which a simulated "feel" of a virtual object is similar to the feel of a real object represented by the virtual object. To observe user interactions with virtual objects, a mapping of virtual objects within a user's environment may be maintained by an on-board computing device of an HMD device, a motion-restricting wearable device, and/or a remote computer in communication with an HMD or motion-restricting wearable device, wherein the mapping may include information regarding a position and shape of each virtual object. Such a mapping may also include metadata regarding material properties of each virtual object (e.g. hardness, texture, etc.). An onboard camera of an HMD, and/or one or more other cameras in a use environment, may observe a location of a user's hand that is wearing the motion-restricting glove, and thereby determine when the hand intersects the glove. Such data may be used to determine a control signal to generate for controlling the electrostatic clutch. Such a computation also may take into account other data, such as a current displacement of the electrodes as sensed via a displacement sensor.

In some instances, a user may wish to prevent or cease the operation of an electrostatic clutch during a virtual experience, for example, to freely move the body part on which a wearable motion-restricting device is worn. For example, in FIG. 1, the user 102 may wish to regain a full range of hand motion while the user's hand intersects the virtual basketball 118. Thus, the wearable motion-restricting device may be configured to recognize specific motions via data received from sensors residing on the wearable device that express intent to regain full hand motion, and in response to recognizing such motions, control the electrostatic clutch to release motion restriction. Likewise, the wearable motion-restricting device may be configured to infer a user intent to start or resume use of an electrostatic clutch based upon such inputs.

Figure 5:
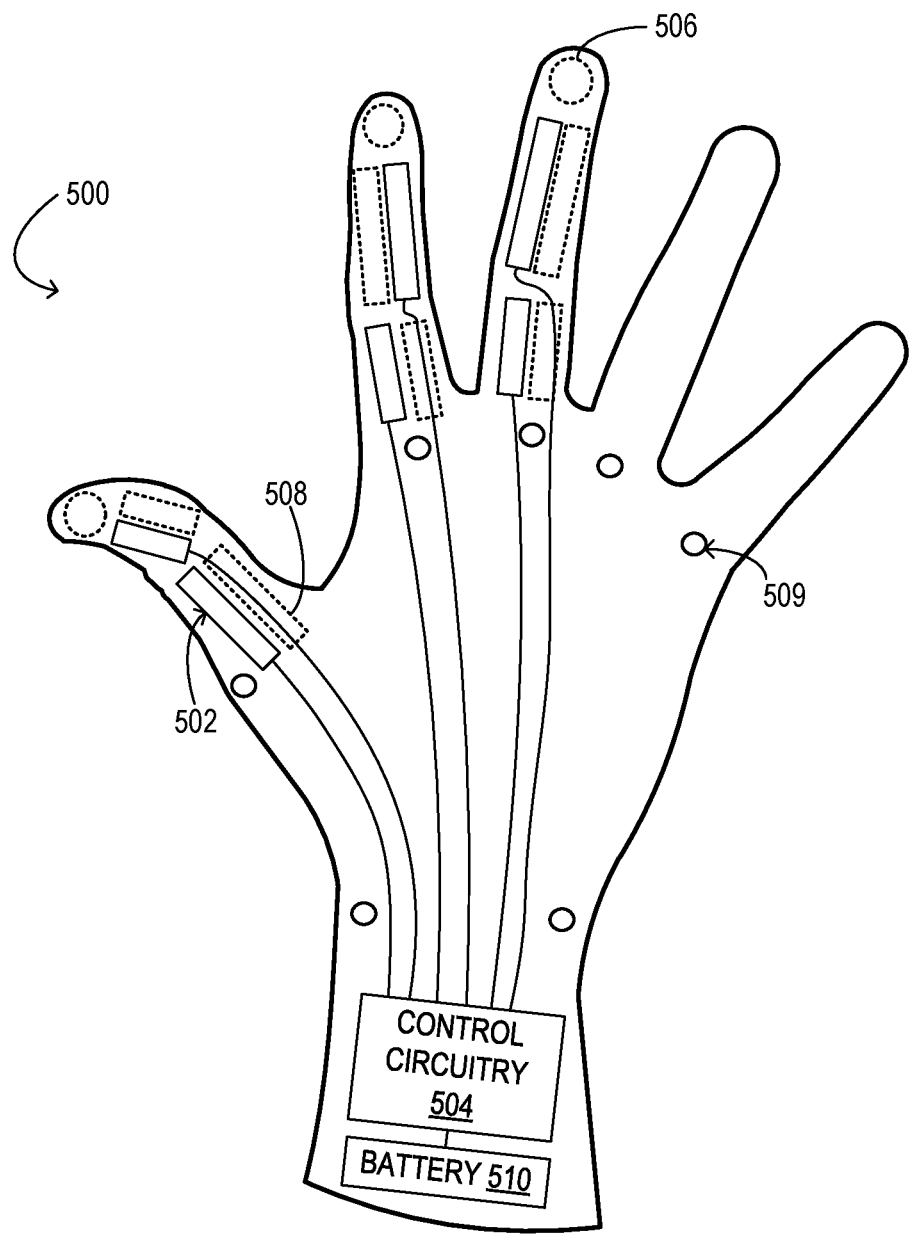
FIG. 5 shows an example wearable device in the form of a glove.

FIG. 5 schematically shows an example wearable device 500 that includes sensors that may be used to sense such expressions of user intent. Wearable device 500 takes the form of a glove comprising a plurality of electrostatic clutches (one of which is indicated at 502), pressure sensors 506, flex sensors 508, and associated control circuitry 504. The pressure sensors 506 are positioned in locations corresponding to fingertips of the thumb, forefinger, and middle finger, but may be positioned at any suitable locations in other examples. The illustrated flex sensors are located on a dorsal side of the hand and oriented along a locking axis of each electrostatic clutch, but may be positioned at any suitable locations in other examples. Various other examples may use one or the other of pressure and touch sensors, and/or may utilize other suitable sensors.

Sensor data received from the pressure sensors 506, flex sensors 508, and/or other suitable sensors may provide control circuitry 504 with information regarding a user intent to release or resume motion restriction. For example, bending sensed along a locking axis of an electrostatic clutch while the electrostatic clutch is controlled to restrict skeletal joint motion may inform the control circuitry 504 that the user wishes to release motion restriction.

Control circuitry 504 may further receive information from other sensors on the wearable device, such as one or more inertial measurement sensors (e.g., magnetometer, gyroscope, and/or accelerometer). For example, the control circuitry 504 may be configured to release or resume motion restriction based upon a sensed pose of the hand received from the inertial measurement sensors.

Control circuitry 504 further may receive information from (or derived from) one or more sensors external to the wearable device, in addition or alternatively to sensors local to the wearable device. For example, an integrated image sensor of a head-mounted display device, or other image sensor in the environment, may capture images of wearable device 500, and the images may be analyzed to identify a plurality of optical markers 509 (or other known features) located on the wireless wearable device in the image data, and thereby generate a three-dimensional pose of the wearable device based upon the identified optical marker locations compared to a model. In some examples, data from a flex sensor 508 (or displacement sensor on an electrostatic clutch) on the wearable device may provide information regarding a bend state of a finger to inform a fitting algorithm of a bend state of that finger, for example, to help perform model fitting. Control signals based upon the determined pose then may be sent to the wearable device 500 to control the operation of one or more electrostatic clutches based upon such pose data.

Wearable device 500 further comprises a power supply, such as a battery 510, connected to control circuitry 504. The control circuitry 504 is configured to form a boosted voltage from a low-voltage output of the battery 510 (e.g. 3-5 V), generate a control waveform to controllably apply charge to a first electrode and a second electrode of an electrostatic clutch (e.g., electrostatic clutch 502), and amplify the control waveform via the boosted voltage to form a control signal to apply to an electrostatic clutch electrode.

Figure 6:
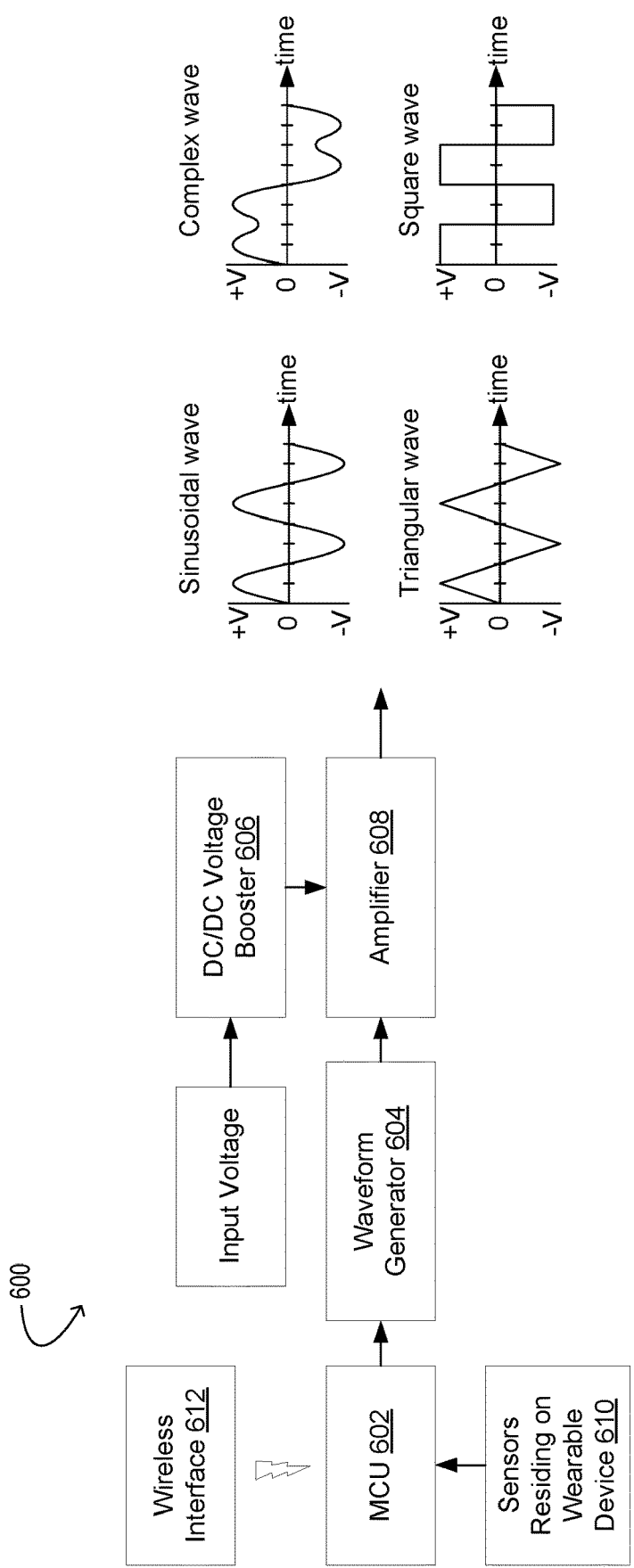
FIG. 6 shows a block diagram illustrating example control circuitry for controlling an electrostatic clutch.

FIG. 6 shows a block diagram illustrating example control circuitry 600 suitable for use as control circuitry 318, 408, and/or 504. Control circuitry 600 comprises a microcontroller unit (MCU) 602, a waveform generator 604, a hysteretic DC/DC voltage converter 606, and an amplifier 608. Control circuitry 600 may be implemented as multiple discrete components, as an application-specific integrated circuit (ASIC), a system-on-chip (SoC), or in any other suitable form. In any example, the control circuitry 600 is configured to be implemented in a wireless wearable device as a lightweight, low-power, portable system to provide a suitable control voltage for an electrostatic clutch as disclosed.

The MCU 602 communicates with an external computing device (e.g., an HMD device) that determines a control signal for controlling the electrostatic clutch (e.g. based upon a detected intersection of the wearable device with a virtual object, and potentially upon specific properties of the virtual object, e.g. metadata regarding hardness/texture), and outputs the control signal to the MCU 602. In other examples, the MCU 602 itself may be configured to determine the control signal to send to an electrostatic clutch of the wireless wearable device based on the current state of the wireless wearable device. MCU 602 further may be configured to interface with one or more sensors residing on the wearable device 610 and/or external to the wearable device (via wireless interface 612) to receive sensor data and process the sensor data to help determine control signals.

Waveform generator 604 comprises a digital-to-analog converter controlled by the MCU 602 to generate an analog control waveform. The waveform generator 604 may be configured to generate a control waveform that is sinusoidal, triangular, square, complex, or has any other suitable shape. In some examples, the waveform generator 604 may be configured to generate a waveform of fixed amplitude and/or period. In other examples, the waveform generator 604 may be configured to generate a control waveform of varying amplitude and/or period.

Hysteretic DC/DC voltage converter 606 comprises a boost converter configured to operate at a low current according to a duty cycle to boost an output voltage of a battery. In one example, the hysteretic DC/DC voltage converter 606 boosts an output voltage in a range of 3 to 5 volts to a boosted voltage in a range of 250 to 430 volts. In another example, the hysteric DC/DC voltage converter 606 is configured to step a 3- to 5-volt battery output up to 650 volts. While traditional voltage converters utilize a large, high voltage power supply for high power output that may not be suited for use in a portable, wireless wearable device, the disclosed hysteretic DC/DC voltage converter 606 utilizes a small current input and consumes little power. As such, the hysteretic DC/DC voltage converter 606 may be implemented in a low-profile form factor suitable for use in a wireless wearable device.

Amplifier 608 is configured to amplify the control waveform generated by the waveform generator 604 via the boosted voltage to form a control signal. Any suitable amplifier may be used. In some examples, the amplifier comprises a voltage-controlled amplifier such as a field-effect transistor (FET) amplifier (e.g. a small signal, high voltage metal-oxide-semiconductor field-effect transistor (MOSFET) amplifier).

Figure 7:
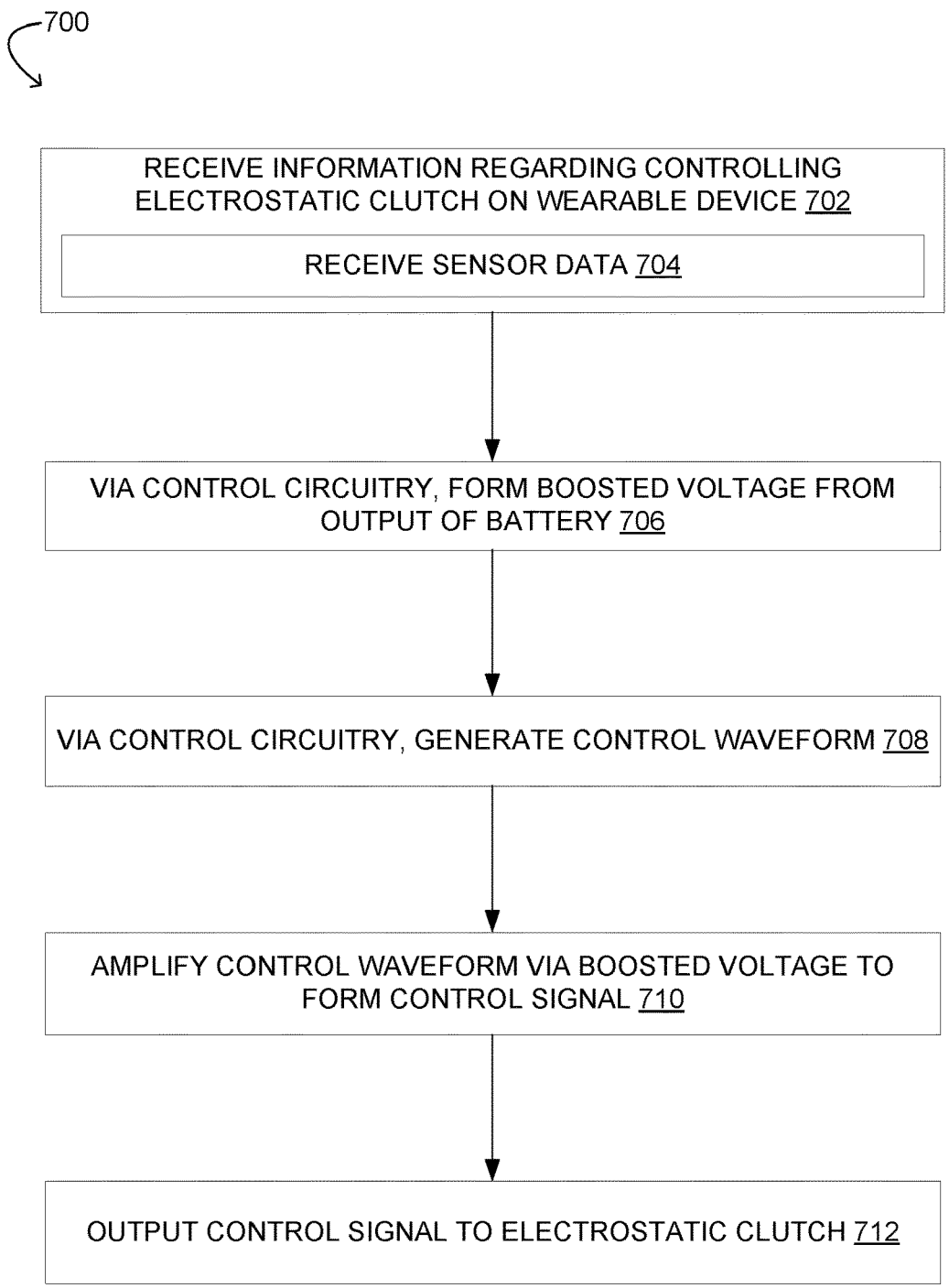
FIG. 7 shows a flowchart illustrating an example method for controlling an electrostatic clutch.

FIG. 7 shows a flowchart illustrating an example method 700 for controlling an electrostatic clutch. Method 700 may be implemented as stored instructions executable by control circuitry on a same portable wearable device as the electrostatic clutch, for example.

At 702, method 700 comprises receiving information for controlling an electrostatic clutch of the wireless wearable device. The information may comprise control instructions from an external computing device (e.g., a virtual or augmented reality HMD device). For example, as described above, a mapping of virtual objects within a user's environment may be maintained by an on-board computing device of the HMD device, and may include information regarding a position and shape of each virtual object. Such information also may include metadata regarding material properties of each virtual object. Using such information, the computing device or MCU may determine a signal to send to the wearable device for controlling the electrostatic clutch.

In some examples, method 700 may comprise receiving sensor data regarding a current state of a wireless wearable device, as indicated at 704. The sensor data may be received from sensors local to the wireless wearable device and/or external to the wireless wearable device. For example, the control signal may be determined based at least in part on a current displacement of the electrodes as sensed via a displacement sensor. Other examples of suitable sensor data include data from a pressure sensor, a flex sensor, an inertial measurement sensor, an integrated image sensor of a HMD device, and an image sensor location elsewhere in a user's environment.

Method 700 comprises, at 706, forming, via control circuitry residing on the wearable device, a boosted voltage from an output of a battery residing on the wireless wearable device. Forming a boosted voltage may comprise boosting a voltage obtained from a battery (which may be on the order of 3-5 V) via a DC/DC voltage converter to a suitable level, such as within a range of 250 to 650 V, or within a range of 300 to 350 volts in more specific embodiments.

At 708, method 700 comprises generating a control waveform via the control circuitry. Generating the control waveform may comprise using a digital-to-analog converter to build an analog voltage waveform, such as a sinusoidal, triangular, square, or complex waveform. In some examples, the control waveform comprises a fixed amplitude and period. In other examples one or more of the amplitude and/or period of the control waveform may be variable.

At 710, method 700 comprises amplifying the control waveform via the boosted voltage to form a control signal. In some examples, the control waveform may be amplified via a small signal, high-voltage metal-oxide-semiconductor field-effect transistor (MOSFET) amplifier circuit. In other examples, any suitable amplifier may be used.

At 712, method 700 comprises outputting the control signal to an electrostatic clutch of the wearable device. Outputting the control signal comprises outputting the control signal to the first electrode and the second electrode of the electrostatic clutch, to provide an electrostatic force between alternately arranged electrode sheets of each electrode. In some examples, outputting the control signal comprises providing electrostatic adhesion starting at 250V to 350V with very low current (e.g., less than 1 µA).

In some examples, an electrostatic clutch may be used in medical, rather than computer-technology applications. Controllable body-movement restriction may be useful for the patient rehabilitating from a skeletomuscular injury such as a back or knee injury, or brain injury such as stroke. In other examples, an electrostatic clutch may be used as an active restraint for management of seizures or potentially dangerous body movements associated with autism, psychiatric disorders, or acute substance abuse.

The example electrostatic clutches disclosed herein may also be amenable to various industrial-safety applications. In one example, machine vision or other environment-sensing componentry may be used to assess whether persons are in close proximity to potentially dangerous machinery. Persons wearing an appropriate electrostatic clutch operatively coupled to the environment-sensing componentry may be protected from drawing too close to the machinery, extending a hand or finger into a cutting device, etc. In other examples, an electrostatic clutch worn by a worker may be configured for skeletal strain mitigation. When the worker is carrying a heavy object, the electrostatic clutch may lock into place, providing additional resistance to motion and relieving stress on the worker's fingers, wrists, arms, legs, and other skeletal joints.

In still other examples, an electrostatic clutch may be used in a variety of electromechanical applications. For example, an electrostatic clutch may provide positive braking for a servomechanical (e.g., a robotic, soft robotic, and/or ball-joint) actuator.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
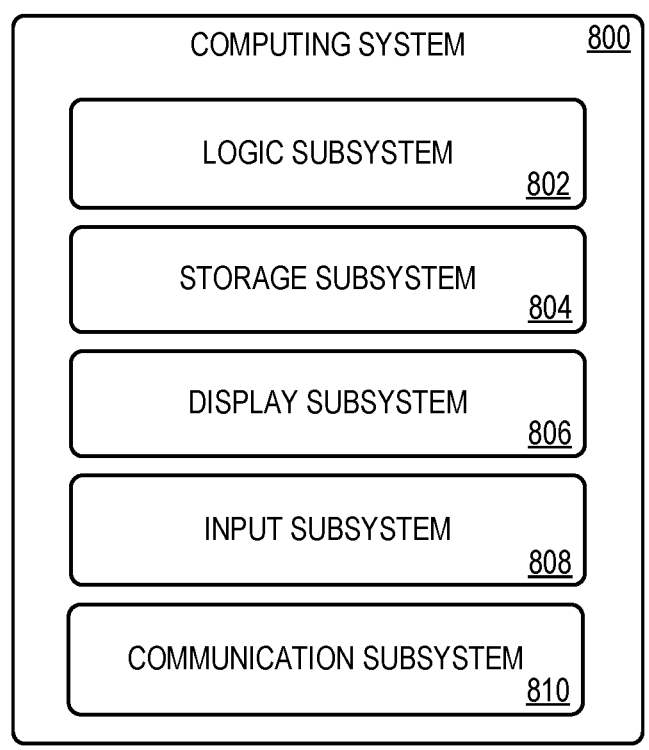
FIG. 8 shows a block diagram illustrating an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program: may be used to describe an aspect of computing system 800 implemented to perform a particular function. In some cases, a program may be instantiated via logic machine 802 executing instructions held by storage machine 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 806 in a shared enclosure, or such display devices may be peripheral display devices.

When included, input subsystem 808 may comprise or interface with one or more user-input devices such as a keyboard, mouse, touch screen, or game controller. In some embodiments, the input subsystem 808 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a wireless wearable device, comprising a flexible wearable base configured to be worn at a location of a skeletal joint, an electrostatic clutch mounted to the flexible wearable base, the electrostatic clutch comprising a first electrode, the first electrode comprising two or more first electrode sheets, each first electrode sheet comprising a core, a conductive layer formed on the core, and a dielectric coating formed on the conductive layer, and the first electrode also comprising a common conductor to which each of the first electrode sheets are connected, and a second electrode comprising two or more second electrode sheets arranged alternately with the first electrode sheets in a stacked arrangement, a tensioner coupled to the electrostatic clutch, a battery, and control circuitry coupled to the electrostatic clutch and configured to generate a control signal to control an electrostatic force between the two or more first electrode sheets and the two or more second electrode sheets. In such an example, the tensioner may additionally or alternatively be disposed between the flexible wearable base and the electrostatic clutch. In such an example, the dielectric coating may additionally or alternatively comprise barium titanate. In such an example, the core may additionally or alternatively comprise bi-axially oriented polyethylene terephthalate (BOPET). In such an example, the common conductor to which each of the first electrode sheets are connected may additionally or alternatively comprise a crimped structure, and each first electrode sheet of the two or more first electrode sheets may additionally or alternatively be positioned within a different alcove of the crimped conductive support structure. In such an example, the common conductor to which each of the first electrode sheets are connected may additionally or alternatively comprise a conductive mechanical fastener. In such an example, the common conductor may additionally or alternatively comprise a conductive epoxy. In such an example, the wireless wearable device may additionally or alternatively comprise a displacement sensor responsive to an area of overlap between first electrode sheets and second electrode sheets, and the control signal may additionally or alternatively depend upon an output of the displacement sensor. In such an example, the wireless wearable device may additionally or alternatively comprise a glove. In such an example, each first electrode sheet may additionally or alternatively comprise a thickness in range of 0.10 mm to 0.16 mm. In such an example, the conductive layer may additionally or alternatively comprise aluminum or copper. In such an example, each second electrode sheet may additionally or alternatively comprise a layered structure having a core layer, a metallic layer formed on the core layer, and a dielectric layer formed on the metallic layer.

Another example provides a wireless wearable device, comprising a flexible wearable base configured to be worn at a location of a skeletal joint, an electrostatic clutch mounted to the flexible wearable base, the electrostatic clutch comprising a first electrode comprising two or more first electrode sheets, and a second electrode comprising two or more second electrode sheets arranged with the two or more first electrode sheets in a stacked arrangement, a battery, and control circuitry configured to form a boosted voltage from an output of the battery, generate a control waveform to controllably apply charge to the first electrode and the second electrode, and amplify the control waveform via the boosted voltage to form a control signal. In such an example, the control circuitry may additionally or alternatively be configured to form the control signal based upon sensor data received from one or more of a pressure sensor, a flex sensor, a displacement sensor, and/or an inertial sensor residing on the wearable device. In such an example, the wireless wearable device may additionally or alternatively comprise one or more optical markers, and the control circuitry may additionally or alternatively be configured to form the control signal based upon image data capturing the one or more optical markers. In such an example, the control circuitry may additionally or alternatively be configured to form the boosted voltage from the output of the battery by boosting a battery output voltage in a range of 3 to 5 volts to form the boosted voltage in a range of 250 to 650 volts. In such an example, the control circuitry may additionally or alternatively be configured to form the boosted voltage via a hysteretic DC/DC voltage converter. In such an example, the wireless wearable device may additionally or alternatively comprise a glove.

Another example provides, on a computing device, a method comprising receiving information regarding controlling an electrostatic clutch of a wireless wearable device, forming, via control circuitry residing on the wearable device, a boosted voltage from an output of a battery residing on the wireless wearable device, generating, via the control circuitry, a control waveform, amplifying the control waveform via the boosted voltage to form a control signal, and outputting the control signal to the electrostatic clutch to change an electrostatic force between two or more sheets of a first electrode and two or more sheets of a second electrode within the electrostatic clutch. In such an example, forming the boosted voltage from the output of the battery residing on the wireless wearable device may additionally or alternatively comprise boosting an output voltage in a range of 3 to 5 volts to a boosted voltage in a range of 250 to 650 volts.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wireless wearable device, comprising:
   a flexible wearable base configured to be worn at a location of a skeletal joint;
   an electrostatic clutch mounted to the flexible wearable base on a first side of the skeletal joint, the electrostatic clutch comprising
      a first electrode, the first electrode comprising two or more first electrode sheets, each first electrode sheet comprising a core, a conductive layer formed on the core, and a dielectric coating formed on the conductive layer, and the first electrode also comprising a common conductor to which each of the first electrode sheets are connected, and
      a second electrode comprising two or more second electrode sheets arranged alternately with the first electrode sheets in a stacked arrangement;
   a tensioner coupled to the electrostatic clutch;
   a flexible structure coupled to the electrostatic clutch, the structure extending across the skeletal joint and coupled to the flexible wearable base on a second side of the skeletal joint;
   a battery; and
   control circuitry coupled to the electrostatic clutch and configured to generate a control signal to control an electrostatic force between the two or more first electrode sheets and the two or more second electrode sheets.

2. The wireless wearable device of claim 1, wherein the tensioner is disposed between the flexible wearable base and the electrostatic clutch.

3. The wireless wearable device of claim 1, wherein the dielectric coating comprises barium titanate.

4. The wireless wearable device of claim 1, where the core comprises bi-axially oriented polyethylene terephthalate (BOPET).

5. The wireless wearable device of claim 1, wherein the common conductor to which each of the first electrode sheets are connected comprises a crimped structure, and wherein each first electrode sheet of the two or more first electrode sheets is positioned within a different alcove of the crimped structure.

6. The wireless wearable device of claim 1, wherein the common conductor to which each of the first electrode sheets are connected comprises a conductive mechanical fastener.

7. The wireless wearable device of claim 6, wherein the common conductor further comprises a conductive epoxy.

8. The wireless wearable device of claim 1, further comprising a displacement sensor responsive to an area of overlap between first electrode sheets and second electrode sheets, and wherein the control signal depends upon an output of the displacement sensor.

9. The wireless wearable device of claim 1, wherein the wireless wearable device comprises a glove.

10. The wireless wearable device of claim 1, wherein each first electrode sheet comprises a thickness in range of 0.10 mm to 0.16 mm.

11. The wireless wearable device of claim 1, wherein the conductive layer comprises aluminum or copper.

12. The wireless wearable device of claim 1, wherein each second electrode sheet comprises a layered structure having a core layer, a metallic layer formed on the core layer, and a dielectric layer formed on the metallic layer.

13. A wireless wearable device, comprising a flexible wearable base configured to be worn at a location of a skeletal joint;
an electrostatic clutch mounted to the flexible wearable base on a first side of the skeletal joint, the electrostatic clutch comprising
a first electrode comprising two or more first electrode sheets, and
a second electrode comprising two or more second electrode sheets arranged with the two or more first electrode sheets in a stacked arrangement;
a flexible structure coupled to the electrostatic clutch, the structure extending across the skeletal joint and coupled to the flexible wearable base on a second side of the skeletal joint;
a battery; and
control circuitry configured to form a boosted voltage from an output of the battery, generate a control waveform to controllably apply charge to the first electrode and the second electrode, and amplify the control waveform via the boosted voltage to form a control signal.

14. The wireless wearable device of claim 13, wherein the control circuitry is further configured to form the control signal based upon sensor data received from one or more of a pressure sensor, a flex sensor, a displacement sensor, and/or an inertial sensor residing on the wearable device.

15. The wireless wearable device of claim 13, further comprising one or more optical markers, and wherein the control circuitry is further configured to form the control signal based upon image data capturing the one or more optical markers.

16. The wireless wearable device of claim 13, wherein the control circuitry is configured to form the boosted voltage from the output of the battery by boosting a battery output voltage in a range of 3 to 5 volts to form the boosted voltage in a range of 250 to 650 volts.

17. The wireless wearable device of claim 13, wherein the control circuitry is configured to form the boosted voltage via a hysteretic DC/DC voltage converter.

18. The wireless wearable device of claim 13, wherein the wireless wearable device comprises a glove.

19. On a computing device, a method comprising:
receiving information regarding controlling an electrostatic clutch of a wireless wearable device;
forming, via control circuitry residing on the wearable device, a boosted voltage from an output of a battery residing on the wireless wearable device;
generating, via the control circuitry, a control waveform;
amplifying the control waveform via the boosted voltage to form a control signal; and
outputting the control signal to the electrostatic clutch to change an electrostatic force between two or more sheets of a first electrode and two or more sheets of a second electrode within the electrostatic clutch.

20. The method of claim 19, wherein forming the boosted voltage from the output of the battery residing on the wireless wearable device comprises boosting an output voltage in a range of 3 to 5 volts to a boosted voltage in a range of 250 to 650 volts.

* * * * *